United States Patent
Kirsch et al.

(10) Patent No.: US 10,868,317 B2
(45) Date of Patent: Dec. 15, 2020

(54) METHOD FOR STARTING A FUEL CELL AND FUEL CELL SYSTEM

(71) Applicant: Volkswagen AG, Wolfsburg (DE)

(72) Inventors: Sebastian Kirsch, Sassenburg (DE); Patrick Zihrul, Braunschweig (DE); Ingmar Hartung, Braunschweig (DE)

(73) Assignee: Audi AG, Ingolstadt (DE)

( * ) Notice: Subject to any disclaimer, the term of this patent is extended or adjusted under 35 U.S.C. 154(b) by 400 days.

(21) Appl. No.: 15/505,834

(22) PCT Filed: Jul. 24, 2015

(86) PCT No.: PCT/EP2015/067079
§ 371 (c)(1),
(2) Date: Feb. 22, 2017

(87) PCT Pub. No.: WO2016/030096
PCT Pub. Date: Mar. 3, 2016

(65) Prior Publication Data
US 2017/0279139 A1  Sep. 28, 2017

(30) Foreign Application Priority Data
Aug. 25, 2014  (DE) .......... 10 2014 216 856

(51) Int. Cl.
*H01M 4/92* (2006.01)
*H01M 8/04223* (2016.01)
(Continued)

(52) U.S. Cl.
CPC ....... *H01M 8/04225* (2016.02); *H01M 4/926* (2013.01); *H01M 8/0488* (2013.01);
(Continued)

(58) Field of Classification Search
None
See application file for complete search history.

(56) References Cited

U.S. PATENT DOCUMENTS 6,399,231 B1  6/2002  Donahue et al.
7,799,475 B2  9/2010  Yu et al.
(Continued)

FOREIGN PATENT DOCUMENTS

CA  2851089  4/2013
CN  1697228  11/2005
(Continued)

OTHER PUBLICATIONS

JP2003272686A—Machine translation (Year: 2003).*
Tang. "PEM fuel cell cathode carbon corrosion due to the formation of air/fuel boundary at the anode." (Year: 2005).*

*Primary Examiner* — Haroon S. Sheikh
(74) *Attorney, Agent, or Firm* — Davidson, Davidson & Kappel, LLC

(57) ABSTRACT

A method for starting a fuel cell and to a fuel cell system which is configured to carry out the method. The fuel cell includes electrically conductive bipolar plates, arranged between which there is in each case a cathode, including a fluid-conducting cathode space, a membrane and an anode, including a fluid-conducting anode space. There is provision that the method includes the following steps in the specified order:

purging the anode space with a fluid in order to expel fuel, —impressing electricity on a unit composed of the cathode (2k)/membrane (1)/anode (2a) by applying a current and/or a voltage, wherein the fluid is applied to the anode space or continues to be so, —switching off the electricity, and —introducing a fuel into the anode space.

20 Claims, 4 Drawing Sheets

(51) Int. Cl.
*H01M 8/04225* (2016.01)
*H01M 8/04858* (2016.01)
*H01M 8/04089* (2016.01)
*H01M 8/1018* (2016.01)

(52) U.S. Cl.
CPC ..... *H01M 8/04089* (2013.01); *H01M 8/0491* (2013.01); *H01M 8/04231* (2013.01); *H01M 8/04238* (2013.01); *H01M 2008/1095* (2013.01); *H01M 2250/20* (2013.01); *Y02T 90/40* (2013.01)

(56) References Cited

U.S. PATENT DOCUMENTS

| | | | |
|---|---|---|---|
| 8,173,314 | B2 | 5/2012 | Chizawa et al. |
| 8,389,173 | B2 | 3/2013 | Akiyama et al. |
| 8,492,046 | B2 | 7/2013 | Yu et al. |
| 9,299,989 | B2 | 3/2016 | Chun et al. |
| 2002/0076582 | A1 | 6/2002 | Reiser et al. |
| 2003/0134164 | A1 | 7/2003 | Reiser et al. |
| 2007/0184314 | A1 | 8/2007 | Kagami |
| 2008/0096060 | A1 | 4/2008 | Breault et al. |
| 2009/0136790 | A1 | 5/2009 | Schrieber et al. |

FOREIGN PATENT DOCUMENTS

| | | |
|---|---|---|
| CN | 104733750 | 6/2015 |
| DE | 10 2005 039 872 B4 | 3/2006 |
| DE | 112004002405 | 12/2006 |
| DE | 10 2007 059 999 A1 | 7/2008 |
| DE | 112005002853 | 3/2010 |
| DE | 102010056416 | 1/2012 |
| DE | 102011009958 | 8/2012 |
| GB | 1296831 | 11/1972 |
| JP | 2003272686 A * | 9/2003 |
| JP | 2009016118 A | 1/2009 |
| WO | WO09625661 | 8/1996 |

\* cited by examiner

METHOD FOR STARTING A FUEL CELL AND FUEL CELL SYSTEM

The present invention relates to a method for starting a fuel cell and a fuel cell system, the fuel cell including electrically conductive bipolar plates, situated between which are a cathode, including a fluid-conducting cathode chamber, a membrane and an anode, including a fluid-conducting anode chamber. The present invention also relates to a fuel cell system configured to carry out the method.

BACKGROUND

Fuel cells utilize the chemical conversion of a fuel with oxygen to water, in order to generate electrical energy. For this purpose, fuel cells contain the so-called membrane electrode unit (MEA for membrane electrode assembly) as the core component, which is an arrangement of an ion-conducting, in particular, proton-conducting membrane and an electrode (anode and cathode) situated on each side of the membrane. In addition, gas diffusion layers (GDL) may be situated on each side of the membrane electrode assembly on the side of the electrodes facing away from the membrane. The fuel cell is generally formed by a plurality of MEAs assembled in a stack, the electric powers of which are cumulative. During operation of the fuel cell, the fuel, in particular, hydrogen $H_2$ or a hydrogen-containing gas mixture, is fed to the anode, where an electrochemical oxidation of $H_2$ to $H^+$ with release of electrons takes place. A (water-bound or water-free) transport of the protons $H^+$ takes place from the anode chamber into the cathode chamber via the electrolytes or the membrane, which separates the reaction chambers from one another in a gas-tight manner and electrically isolates them. The electrons provided at the anode are conveyed to the cathode via an electrical line. Oxygen or an oxygen-containing gas mixture is fed to the cathode. After the oxygen is adsorbed at the cathode, the oxygen subsequently reacts by taking on electrons and protons to form water.

The fuel cell stack is formed by a plurality of membrane electrode assemblies arranged in a stack. One bipolar plate each is situated between two membrane electrode assemblies, which ensures a supply of operating media, i.e. the reactants and a coolant, to the individual cells. In addition, the bipolar plates ensure an electrically conductive contact between the membrane electrode assemblies. They also ensure a sealed separation between the anode chamber and the cathode chamber.

Once fuel cells are switched off, oxygen, for example, in the form of air, diffuses into the anode chambers as a function of the holding time. When restarting the fuel cell, hydrogen is fed to the anode chambers and the oxidation medium, for example, air, is fed to the cathode chambers.

The switch-off strategy described in US 2003/0134164 A1 provides stopping the supply of hydrogen to the anode flow channels when the fuel cell is switched off and introducing air. The oxidation medium is used to purge the remaining hydrogen from the anode chambers, so that the fuel cell is no longer capable of generating electricity. The oxidation medium introduced into the anode chambers also removes all remaining accumulations of water therein, in order to prevent a freezing of the water in the switched-off state. The oxidation medium may also be used to purge the cathode flow channels of the bipolar plates in order also to remove moisture in these areas.

DE 10 2005 039 872 B4 provides another method for purging a fuel cell during switch-off of the same. For this purpose, the cathode chambers are briefly purged with hydrogen when the fuel cell is switched off and, in so doing, the anode/cathode open circuit voltage (OCV) is rapidly ramped down. This is followed by an air purging through anode flow channels and cathode flow channels. The main purpose of the hydrogen purging is to lower the anode/cathode open circuit voltage and thus to avoid a hydrogen/air front, while the cathode is filled with air.

In DE 10196359 T1, it is provided to purge both the cathode chambers as well as the anode chambers, in order to regenerate the efficiency of the fuel cell.

According to DE 10 2007 059 999 A1, the switching-off of the fuel cell stack includes a separation of the stack from the primary electrical device while applying an auxiliary load. Thereafter, the inflow of air into the cathode side is prevented, while a hydrogen overpressure is maintained on the anode side. Both take place by closing corresponding inlet valves and outlet valves. The stack is subsequently short-circuited and oxygen on the cathode side is allowed to be consumed by hydrogen from the anode side. The required valves are comparatively complex, however, and expensive and require a correspondingly large installation space.

Without being limited to one particular theory, it is assumed that the main reason for the performance deterioration of the fuel cell is attributed to the presence of air on the anode side during the conventional "air/air-start". In this case, a hydrogen/air front forms on the anode side, while the cathode chambers are acted upon by air. The presence of the hydrogen/air front at the anode causes a degradation of the cathode. The reason for the degradation is an increased half-cell potential of the cathode in the air/air area of the fuel cell, which results from the voltage impressed by the hydrogen/air area. This increased cathode potential results in a corrosion of the carbon carrier material of the catalyst situated in the cathode. This corrosion results in irreversible damage to or deterioration of the fuel cell efficiency.

An optimized start method with respect to this damage provides for the purging of the anode chamber of the fuel cell with a, in particular, inert purging gas such as, for example, nitrogen, before the hydrogen supply is activated ("nitrogen/air-start"). The formation of the hydrogen/air front on the anode side is prevented as a result of the nitrogen buffer. In this way, it is possible to expel the oxygen from the anode chambers, but not chemically bonded oxygen, in particular, in the form of oxides of the catalytic electrode material.

From JP 2009-016118 A it is also known to provide a substance in a compound to the cathode chamber, which adsorbs oxygen and thereby binds it. The disadvantage of this is in the use of the appropriate substance which, in particular, in vehicle systems, may accordingly dissolve and pass into the area of the fuel cell. A further disadvantage is that the absorbed oxygen must be discharged again. For this purpose, the adsorption unit, for example, must be replaced accordingly or provided with a complex control and a corresponding operating method for expelling oxygen in certain operating situations.

SUMMARY OF THE INVENTION

It has further been found that all of the methods described for preventing a hydrogen/air front, in particular, the hydrogen/air start, in fact resulted in a slowing down of the reduction in efficiency of the fuel cell, but do not entirely prevent the degradation of the electrodes, which is compensated for by increased amounts of catalyst material. The catalyst material, however, is a cost-determining factor in the production of fuel cells.

One object of the present invention is to avoid the disadvantages of the methods described and to provide a method for operating a fuel cell system, which at least reduces the degradation during a re-start of the fuel cell and makes it possible to reduce the required amount of catalyst in the fuel cell systems.

The present invention relates to a method for starting a fuel cell, the fuel cell including electrically conductive bipolar plates. Situated between the bipolar plates are in each case a cathode, including a fluid-conducting cathode chamber, a membrane and an anode, including a fluid-conducting anode chamber. According to the present invention, it is provided that the method includes at least the following steps and preferably in the order indicated:

1. purging the anode chamber with a fluid in order to expel fuel,
2. impressing electricity on the fuel cell (including the cathode/membrane/anode assembly) by applying a current and/or a voltage, the anode chamber being or continuing to be acted upon by the fluid.
3. switching off the electricity, and
4. introducing a fuel into the anode chamber.

The advantage of the present invention is, in particular, that the efficiency of the membrane-electrode assembly is maintained during a re-start of the fuel cell system. A degradation of catalytic material and/or a degradation of carbon due to the start is significantly reduced or may even be entirely prevented. As a result, the amount of catalyst in the electrode area of the fuel cell may be advantageously reduced which, in turn, results in cost savings in the production of the fuel cell systems.

The reason for this is, in particular, that not only is the gaseous portion of oxygen in the anode chamber removed with the method according to the present invention, as is the case, for example, when purging the anode chambers with a fluid, but also the chemically bonded portion of oxygen is also discharged from the anode chamber or from the anode. Oxygen, if it is present chemically bonded in the anode or on the surface thereof, usually involves oxides and/or hydroxides of the catalyst. The presence of oxygen, for example, as a consequence of the purging of the anode chamber with air when shutting down the fuel cell, results in the formation of metal oxides and metal hydroxides, for example, platinum oxides, which are relatively inactive or wholly inactive with respect to the reaction to be catalyzed. The result of the method according to the present invention, in particular, the second step of the method, is that the oxides and/or hydroxides are electrochemically degraded, i.e., the catalytic metal is reduced and the catalyst in elementary form (oxidation level zero) is therefore once again available for the fuel cell reaction. The efficiency of the fuel cell is maintained or regenerated.

The anode chamber is purged with a fluid in the first step of the method, preferably by applying a flowing gas to the anode chamber or to the anode flow channels. The fluid is, in particular, an inert gas, for example $N_2$. In an alternative implementation, a small amount of hydrogen may also be added to the inert gas in order to cause a controlled chemical reduction of the gaseous oxygen located in the anode chamber. The supplied purging fluid passes into the flow channels of the active area via a distributor area of the bipolar plate and from there is discharged again via a second distributor area of the bipolar plate. Gas, such as oxygen, located in the anode chamber is then dispelled with the flow through the flow channels and, therefore, also through the anode chamber of the fuel cell. Accordingly, the purging of the anode chamber with a fluid advantageously results in the removal of oxygen ($O_2$) in gaseous form from the anode chamber. Here, the term "anode chamber" in conjunction with the present invention is understood to mean the space located between the membrane and the anode side of the bipolar plate. Thus, this includes not only the anode flow field of the bipolar plate, i.e. the anode flow channels, but also a gas diffusion layer optionally situated on the anode side. The same applies to the term "cathode chamber".

In contrast, the impressing of electricity on the membrane-electrode assembly in the second step of the method by applying a current and/or a voltage results in the electrochemical degradation of the oxygen chemically bonded in the form of oxides and hydroxides. For a better understanding, the redox total reactions are represented in the equations 1 and 2 using the example of platinum as the catalyst material.

$$PtOH + H^+ + e^- \leftrightarrows Pt + H_2O \quad (1)$$

$$PtOH + 2H^+ + 2e^- \leftrightarrows Pt + H_2O \quad (2)$$

The shift of the equilibrium to the side of the elementary platinum takes place preferably by inducing a current flow in the fuel cell (more precisely, in the fuel cell stack). The free electrons moved by the current flow result in the reduction of platinum shown in the equations 1 and 2, so that the equilibrium of the reactions is shifted to the side of the elementary platinum.

The term electricity in the present case is to be considered a generic term for phenomena, which are caused by a resting or moved electrical charge. Thus, electricity in the present case is understood to mean a voltage, i.e. an electric potential difference and/or an electrical current flow.

In the third step of the method, the electricity is subsequently switched off, i.e., the applied current flow or the applied voltage is interrupted. In the simplest case, the electricity is switched off by switching off the current or the voltage. This like the switching-on in the second step may take place abruptly or with a predefined degressive (progressive when switching on) curve.

The actual start of the fuel cell subsequently takes place in the fourth step by introducing a fuel, in particular, hydrogen, into the anode chamber of the fuel cell. This takes place in a known manner by flooding the anode flow channels with the corresponding fuel. It is understood that no later than at this point in time the cathode chamber of the fuel cell is filled with an oxidation medium, in particular, air. The electrochemical potential, which may be measured as a voltage drop across the membrane, is formed by the presence of fuel on the one side of the membrane and the oxidation medium on the other side of the membrane. The resulting voltage may then be tapped and utilized externally as electrical energy, for example, for driving an electrical consumer or for charging a battery.

In order to discharge the forming gaseous oxygen from the anode chamber, or to facilitate its discharge, the purging of the anode chamber with the fluid of the first step is preferably continuously carried out even during the impressing of electricity of the second step, optionally continued even briefly beyond the second step. In this implementation, therefore, the steps 1 and 2 overlap chronologically. Alternatively, a renewed purging of the anode chamber with the fluid may take place in an additional method step after the second step.

In one preferred embodiment of the present invention, it is provided that the fluid for purging the anode chamber is nitrogen. This is particularly advantageous, since nitrogen is not a reaction partner of the fuel cell reaction and, in addition, is inert with respect to the materials inside the anode chamber.

In an alternative or additional embodiment, an anode loop, i.e., a half cell circulation for operating gas associated with the anode, includes a catalyst, to which a reduction agent for molecular oxygen is added in order to facilitate a chemical degradation of the gaseous oxygen. Thus, a depletion of the oxygen occurs upstream from the anode in the anode loop, which in turn results in an enrichment of the inert gas in this area. For this purpose, the fuel, in particular, hydrogen may preferably be used, which is added to the inert gas after the purging operation. This is preferable since the fuel (hydrogen) is already reserved for operating the fuel cell.

In another preferred embodiment of the present invention, it is provided that an intensity of the impressed electricity is controlled via the intensity of the applied voltage, i.e., the voltage drop across the fuel cell, and/or of the applied current, i.e., the current intensity. It is particularly preferred in this case that the applied voltage and/or the applied current is regulated via a measured variable, which directly or indirectly provides information about the electrochemical reaction of the existing platinum oxide taking place. If, for example, a constant current flow is applied to the fuel cell, a conclusion may be drawn via the time curve of the resulting voltage about the progress of the chemical reaction.

The electricity is preferably produced by applying an external voltage and/or a current with the aid of a bidirectional DC-DC converter.

The voltage or the current is preferably applied via the electrically conductive bipolar plates. In this case a series connection with respect to the fuel cell stack is preferred. No additional interconnection effort results, since the bipolar plates in existing fuel cells are, in principle, electrically interconnected. A battery is advantageously used as a current source or voltage source. In such case, a battery conventionally used for energy storage during fuel cell operation, in particular, is employed.

In another preferred embodiment of the method according to the present invention, the impressed electricity results from an applied voltage in the range of 0.5 V to 1.5 V, in particular in the range of 0.7 V to 1.3 V, since the resulting potential differences displace the redox reactions represented in the equations in favor of elementary platinum and water.

It is further preferred that the electricity is applied to the membrane electrode assembly for a period of 0.1 s to 120 s, in particular from 0.1 s to 45 s, preferably 0.1 s to 5 s. It has been found that this time period is sufficient in order to reduce at least a major portion of the platinum oxide and to stabilize the efficiency of the membrane electrode assembly.

The intensity and duration of the impressed electricity are preferably selected in such a way that a predetermined portion of elementary catalytic metal is obtained at the end of the second step. For example, at least 50% by weight of the existing catalytic material, preferably at least 70% by weight should be present oxygen-free.

The current flow induced by the impressing of electricity is advantageously opposite a current flow direction during operation of the fuel cell, in order to reduce the platinum oxide and platinum hydroxide formed on the anode in this way.

In one preferred embodiment of the method according to the present invention, it is provided that a fuel is introduced with a time delay after the electricity is switched off. This embodiment of the present invention advantageously results in a regeneration and stabilization of the fuel cell system.

Another aspect of the present invention relates to a fuel cell system, including a fuel cell. The fuel cell includes electrically conductive bipolar plates, situated between which are a cathode, including a fluid-conducting cathode chamber, a membrane and an anode, including a fluid-conducting anode chamber, respectively. The fuel cell system also includes a voltage source and a control unit, which is configured to carry out the method according to the present invention.

In a particularly preferred embodiment of the fuel cell system according to the present invention, the control unit is configured to control the current flow and/or the electric potential across a current and/or across a voltage.

In addition, sensors are advantageously provided in the fuel cell system, which allow the current flow and/or the electric potential to be regulated based on parameters, which correspond to a content of platinum oxides in or on the anode or to a content of oxygen in the anode chamber.

The various specific embodiments of the present invention cited in this application are advantageously combinable with one another, unless specifically stated otherwise.

BRIEF DESCRIPTION OF THE DRAWINGS

The present invention is explained below in exemplary embodiments with reference to the associated drawings.

DETAILED DESCRIPTION

Figure 1:
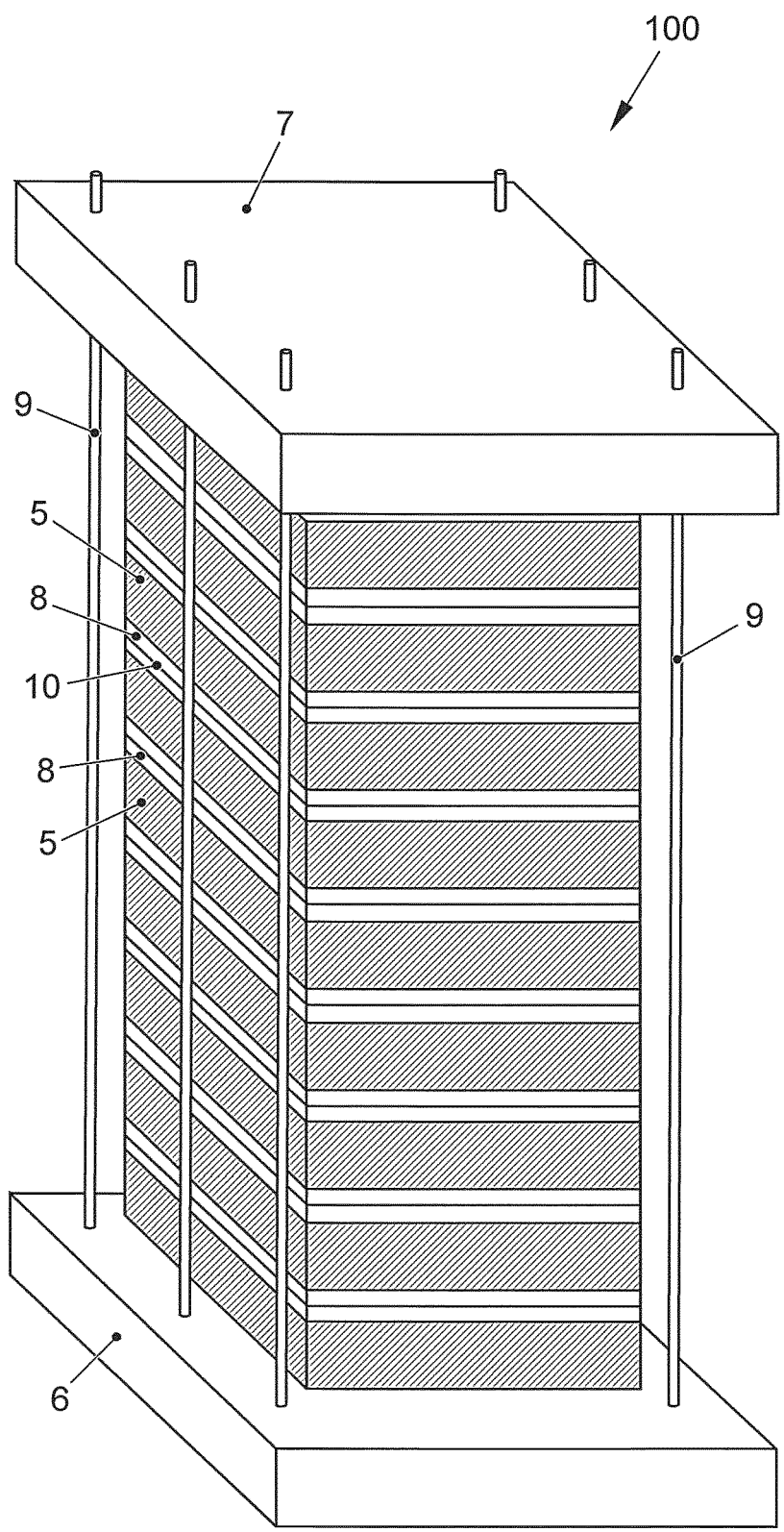
FIG. 1 schematically shows a fuel cell.

FIG. 1 shows a highly schematic representation of a fuel cell (also referred to as a fuel cell stack). Fuel cell 100 includes a first end plate 6 and a second end plate 7. A plurality of stack elements stacked on top of one another, which include bipolar plates 5 and membrane-electrode assemblies 10, is situated between end plates 6, 7. Bipolar plates 5 are alternatingly stacked with membrane electrode assemblies 10. Membrane electrode assemblies 10 each include a membrane and electrodes connected on both sides of the membrane, namely, an anode and a cathode (not depicted). Sealing elements 8, which seal the anode chambers and cathode chambers to the outside in a gas-tight manner, are each situated between bipolar plates 5 and membrane electrode assembly 10. Fuel cell 100 is pressed between end plates 6 and 7 with the aid of ties 9, for example, tie rods or tensioning plates.

In FIG. 1, only the narrow sides of bipolar plates 5 and membrane electrode assemblies 10 are visible. The main surfaces of bipolar plates 5 and membrane electrode assemblies 10 abut one another. The representation in FIG. 1 is not dimensionally accurate in part. Typically, a thickness of an individual cell, made up of a bipolar plate 5 and a membrane electrode assembly 10, is a few mm, membrane electrode assembly 10 being by far the thinner component. In addition, the number of individual cells is normally significantly greater than is depicted.

Figure 2:
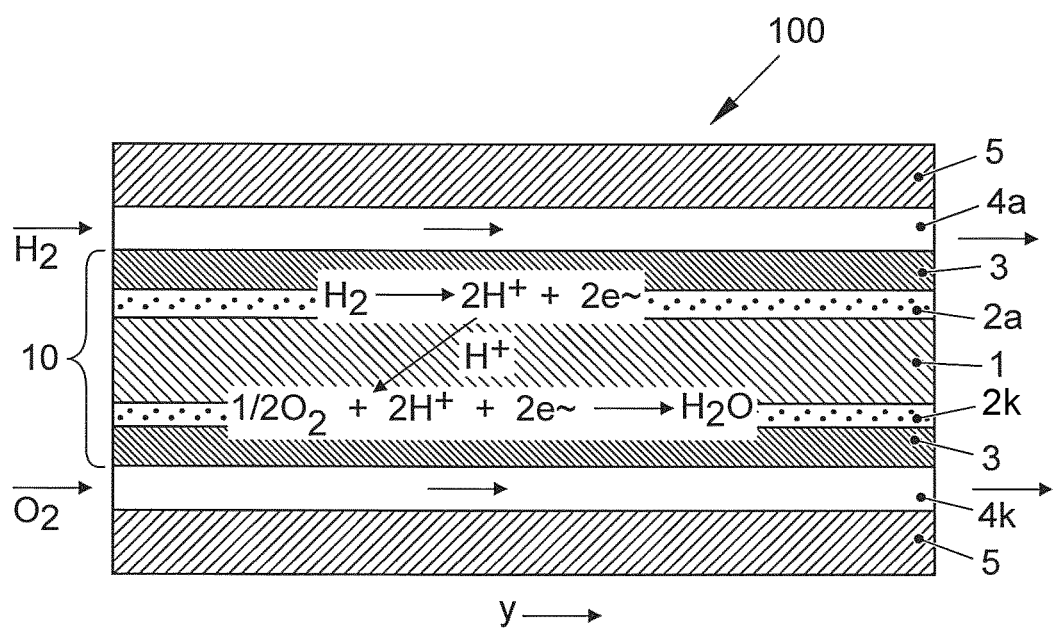
FIG. 2 schematically shows a sectional view of an individual cell of a fuel cell stack.

A sectional view of an individual cell of a PEM fuel cell 100 is schematically depicted in FIG. 2.

Fuel cell 100 includes a membrane electrode assembly 10 as the core component, which includes a polymer electrolyte membrane 1, as well as one electrode each connected to the two flat sides of membrane 1, namely an anode 2a and a cathode 2k. Membrane 1 is a polymer electrolyte membrane, which is preferably capable of conducting cations, in particular protons ($H^+$). Electrodes 2a, 2k include a catalytic material, for example, platinum, which is supported on an electrically conductive material, for example a carbon-based material.

A gas diffusion layer 3, which essentially has the function of uniformly distributing the supplied operating gases over the main surfaces of electrodes 2a, 2k and membrane 1, is connected to each of electrodes 2a, 2k.

A bipolar plate 5 is situated on the outsides of each gas diffusion layer 3. Bipolar plates 5 have the function of electrically connecting individual membrane electrode assemblies 10 of the individual cells in the stack to one another, of cooling the fuel cell stack and of supplying the operating gases to electrodes 2a, 2k. For the last-mentioned purpose, bipolar plates 5 (also called flow field plates) include flow fields 4a, 4k. Flow fields 4a, 4k, for example, include a plurality of flow channels situated in parallel to one another, which are incorporated into plates 5 in the form of grooves or slots. Each bipolar plate 5 normally includes an anode flow field 4a on its one side, which faces anode 2a and a cathode flow field 4k on its other side, which faces cathode 2k. In the present case, only one flow field 4a, 4k each is reproduced for each of the two bipolar plates 5 depicted, the section depicted extending along one flow channel, respectively. During normal operation of the fuel cell, a fuel, in particular, hydrogen ($H_2$) is fed to anode flow field 4a, whereas an oxygen ($O_2$)-containing operating medium, in particular, air, is fed to cathode flow field 4k.

The reactions taking place at anode 2a and cathode 2k are also depicted in FIG. 2. Accordingly, a catalytic oxidation of hydrogen $H_2$ into protons $H^+$ with release of electrons $e^-$ takes place at anode 2a. The protons migrate through proton-conducting membrane 1 and reach cathode 2k. There, the supplied oxygen $O_2$ reacts with the protons to form water $H_2O$, the oxygen being reduced and thus takes on electrons. The electrons of the anode reaction are fed to the cathodes via an external electric circuit not depicted herein.

Figure 3A:
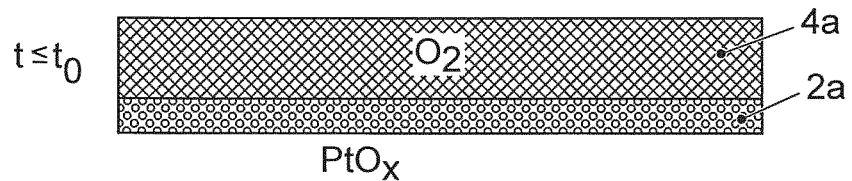
FIGS. 3a through 3f show gas ratios in the anode chamber and the state of the anode at various points in time of the method according to the present invention in a preferred implementation.
Figure 3B:
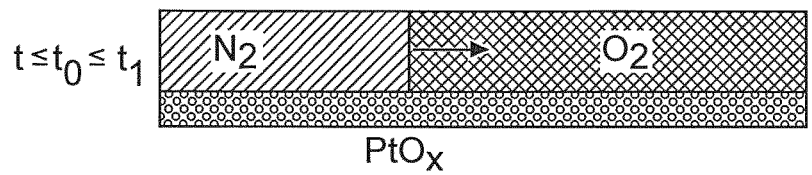
Figure 3C:
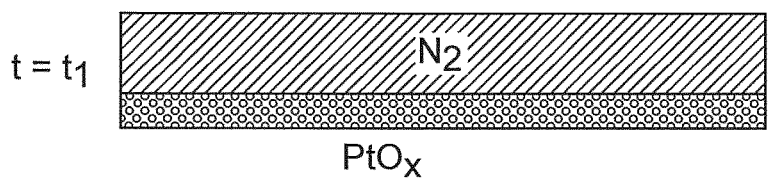
Figure 3D:
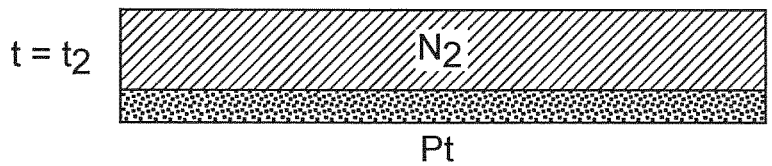
Figure 3E:
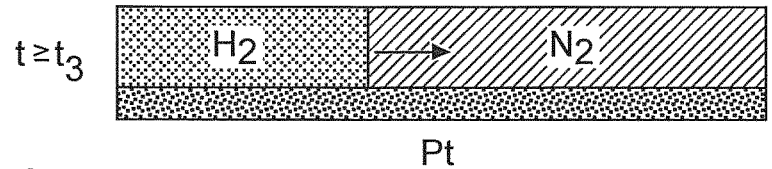
Figure 3F:
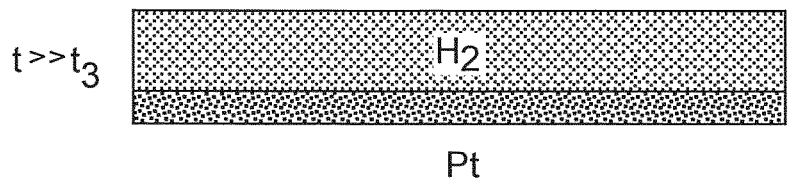
Figure 4:
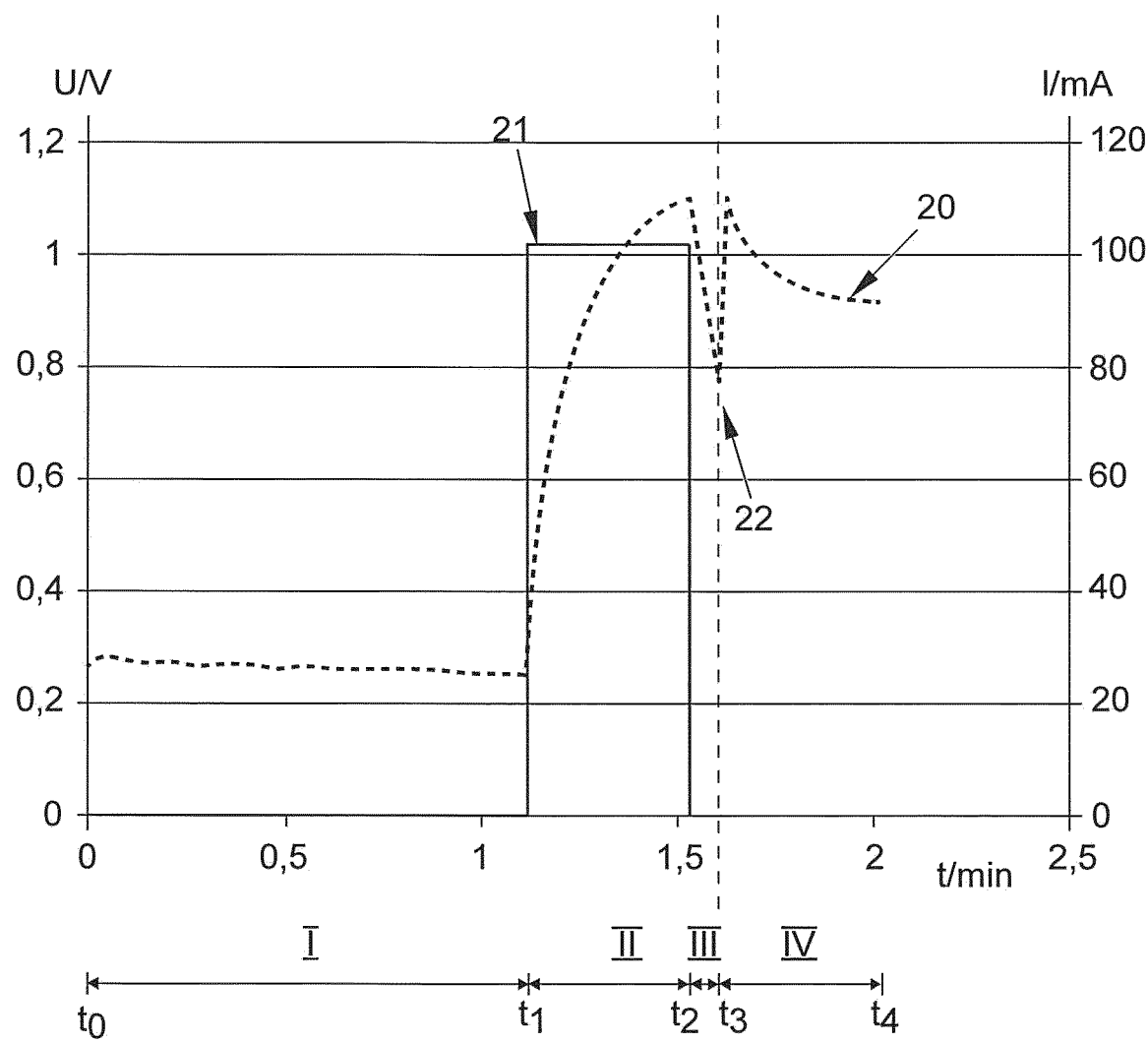
FIG. 4 shows a current-/voltage time diagram of the method according to the present invention in a preferred implementation.

The sequence of the method according to the present invention for starting a fuel cell is explained in a preferred implementation with reference to FIGS. 3 and 4. FIG. 3 schematically depicts the conditions in a flow channel of anode flow field 4a and of anode 2a at various points in time while the method according to the present invention is being carried out. The depiction of gas diffusion layer 3 was omitted in FIG. 3. FIG. 4 shows a current-/voltage time diagram (U(t)/I(t)) of a fuel cell during the method. The curve of a voltage (U) 20 (left ordinate) depicted in volts and the curve of a current (I) 21 (right ordinate) measured in mA are shown as a function of time (t) in minutes (abscissa).

At the start of the method at point in time $t_0$, anode flow field 4a is filled completely with $O_2$. As a result, the catalytic material is present in part in the form of platinum oxides $PtO_x$ (FIG. 3a). At point in time $t_0$, the method is started by applying a purging fluid, in this case nitrogen $N_2$, to the anode chamber. A nitrogen/oxygen front forms and in this phase, the nitrogen forces the oxygen out of anode flow field 4a (FIG. 3b). This first method phase labelled with I in FIG. 4 takes place over a purge duration of 0.5 min to 1.5 min, in particular, of 1 min to 1.25 min, in this case of 1.1 min to 1.2 min. At the end of this phase I, the entire anode flow field 4a is filled completely with nitrogen at point in time $t_1$, whereas anode 4a continues to be present in part in the form of $PtO_x$ (FIG. 3c).

In a subsequent second method phase II, electricity is impressed on the fuel cell, in particular, on its bipolar plates for 18 s to 120 s, in particular, for 24 s to 36 s at point in time $t_1$. This takes place current-controlled in the specific embodiment shown. A voltage 20 results from impressed current 21, which lags behind the current (see FIG. 4). This lagging behind becomes clear insofar as voltage 20, in contrast to induced current 21, shows a flat rise rather than an abrupt rise. In the specific embodiment depicted, the nitrogen supply is not interrupted even during the impression of the electricity. In this phase II, the electrochemical reduction of platinum oxides takes place as a result of induced current flow 21 and/or of resulting voltage 20. The observed lagging behind of the voltage is attributable to the ongoing reduction of the platinum oxides. Water forming during the reduction is discharged from the anode chamber by the uninterrupted purging with nitrogen. At the end of method phase II, the catalytic material of anode 2a is present in the form of platinum Pt at point in time $t_2$ (FIG. 3d).

A third phase III begins at point in time $t_2$ and is initiated by the interruption of current 21, by shutting off the current supply. Current 21 drops abruptly to 0 mA. Voltage 20 again lags behind the current so that measured voltage 20 in third phase III sinks, but does not reach the zero point. In method phase III, lasting approximately 2 s to 15 s, preferably 3 s to 10 s, in particular, 5 s to 7 s, the anode chamber continues to be continuously purged with nitrogen. The duration of this phase is preferably short in order to counteract the renewed formation of platinum oxides and platinum hydroxides as a result of oxygen diffusing in.

The supply of fuel, in this case hydrogen $H_2$, begins at point in time $t_3$, and with that fourth method phase IV. A hydrogen/nitrogen front forms and the hydrogen forces the nitrogen out of the anode chamber (FIG. 3e). The introduced hydrogen induces the actual fuel cell reaction and a potential difference forms across the membrane, since the cathode chamber is simultaneously supplied with oxygen, in particular, air. The electrochemical potential difference is measured as voltage 20, without a current 21 being applied. (FIG. 4).

At the end of the start process and during operation of the fuel cell, the entire anode chamber is filed with hydrogen (FIG. 3f).

LIST OF REFERENCE NUMERALS 1 membrane
2 electrode
2a anode
2k cathode
3 gas diffusion layer—GDL
4a anode flow field
4k cathode flow field
5 bipolar plate—BPP
6 first end plate
7 second end plate
8 sealing element
9 tie
10 membrane electrode assembly—MEA
100 fuel cell
20 voltage
21 current

The invention claimed is:

1. A method for operating a fuel cell, the fuel cell including electrically conductive bipolar plates, between which are situated a cathode, including a fluid-conducting cathode chamber, a membrane and an anode, including a fluid-conducting anode chamber, the method comprising the following steps in the specified order:
    shutting down the fuel cell by ceasing the flow of fluid into the fuel cell and purging the anode chamber with air such that an anode flow field of the anode chamber is filled with oxygen;
    purging the anode chamber with an inert gas in order to expel the oxygen present in the anode flow field of the anode chamber while the flow of fluid into the anode chamber is ceased;
    impressing electricity on the fuel cell by applying a current or a voltage, the anode chamber being or continuing to be acted upon by the fluid;
    switching off the electricity, and
    introducing a fuel into the anode chamber.

2. The method as recited in claim 1 wherein the fluid for purging the anode chamber is nitrogen.

3. The method as recited in claim 1 wherein an intensity of the impressed electricity is controlled by an intensity of the applied voltage or of the applied current.

4. The method as recited in claim 1 wherein a voltage in the range of 0.5 V to 1.5 V is applied or induced.

5. The method as recited in claim 1 wherein a direction of the applied current flow is opposite a direction of the current flow during operation of the fuel cell.

6. The method as recited in claim 1 wherein a current flow of the current is induced for a duration in the range of 0.1 s to 50 s.

7. The method as recited in claim 1 wherein the fuel is introduced with a time delay after the electricity is switched off.

8. The method as recited in claim 1 wherein the oxygen is present in air in the anode chamber.

9. The method as recited in claim 1 wherein the purging forms an inert gas/oxygen front to force the oxygen out of the anode chamber with the inert gas.

10. The method as recited in claim 9 after the purging an entirety of the anode chamber is filled with the inert gas.

11. The method as recited in claim 10 wherein supply of the inert gas continues during the impressing step to reduce platinum oxides at the anode.

12. The method as recited in claim 10 wherein the introducing of the fuel creates a hydrogen/inert gas front.

13. The method as recited in claim 1 wherein during the switching off step, the anode chamber continues to be acted upon by the fluid.

14. The method as recited in claim 1 wherein the purging step is performed for a duration prior to the impressing of electricity.

15. The method as recited in claim 14 wherein the duration is 0.5 min to 1.5 min.

16. The method as recited in claim 14 wherein the purging step is performed for a duration after the impressing of electricity has stopped.

17. The method as recited in claim 16 wherein the duration after the impressing of electricity has stopped is 2 s to 15 s.

18. A fuel cell system comprising:
    a fuel cell including two electrically conductive bipolar plates, a cathode, including a fluid-conducting cathode chamber, a membrane and an anode, including a fluid-conducting anode chamber;
    a voltage source; and
    a control unit, the control unit configured to carry out the method steps as recited in claim 1.

19. A method for starting a fuel cell, the fuel cell including electrically conductive bipolar plates, between which are situated a cathode, including a fluid-conducting cathode chamber, a membrane and an anode, including a fluid-conducting anode chamber, the method comprising the following steps in the specified order:
    purging the anode chamber with a fluid in order to expel oxygen present in the anode chamber;
    impressing electricity on the fuel cell by applying a current having a current flow of the current for a duration in the range of 0.1 s to 50 s, the anode chamber being or continuing to be acted upon by the fluid;
    switching off the electricity, and
    introducing a fuel into the anode chamber.

20. A method for starting a fuel cell, the fuel cell including electrically conductive bipolar plates, between which are situated a cathode, including a fluid-conducting cathode chamber, a membrane and an anode, including a fluid-conducting anode chamber, the method comprising the following steps in the specified order:
    purging the anode chamber with an inert gas in order to expel oxygen present in the anode chamber and an amount of hydrogen in order to cause a controlled chemical reduction of the gaseous oxygen located in the anode chamber;
    impressing electricity on the fuel cell by applying a current, the anode chamber being or continuing to be acted upon by the inert gas while the current is applied, the impressing electricity being stopped while the purging the anode chamber with the inert gas continues;
    switching off the electricity, and
    introducing a fuel into the anode chamber.

* * * * *